Patented Mar. 2, 1937

2,072,829

UNITED STATES PATENT OFFICE 2,072,829

N-METHYL-C,C-ALLYL-ISOPROPYL-BARBITURIC ACID AND PROCESS FOR MANUFACTURE OF THE SAME

Otto Schnider, Basel, Switzerland, assignor to Hoffmann-La Roche Inc., Nutley, N. J., a corporation of New Jersey No Drawing. Application May 8, 1936, Serial No. 78,733. In Switzerland May 17, 1935

1 Claim. (Cl. 260—33)

It has been found that N-methyl-C,C-allyl-isopropyl-barbituric acid possesses valuable therapeutic properties. The new compound is particularly well suited for narcotic purposes. By intravenous injection of aqueous solutions of the sodium salt deep narcosis is obtained which by further slow injection may be kept at the profound stage necessary for surgical operations.

N-methyl-C,C-allyl-isopropyl-barbituric acid is obtained by the action of methylating agents on C,C-allyl-isopropyl-barbituric acid, of allyl halides on N-methyl-C-isopropyl-barbituric acid or of methyl-carbamide on allyl-isopropyl-malonic-ester.

N-methyl-C,C-allyl-isopropyl-barbituric acid melts at 56–57° C. It is easily soluble in the usual organic solvents, difficultly soluble in water and is to be used for therapeutic purposes.

*Example 1*

210 parts by weight of C,C-allyl-isopropyl-barbituric acid are dissolved in 1300 parts by weight of water and 118.7 parts by weight of 33.7% sodium hydroxide solution. While stirring 126 parts by weight of dimethyl sulphate are dropped into the solution. Reaction takes place immediately with evolution of heat. The reaction product is precipitated as an oil. For removing small quantities of tetra-alkyl-barbituric acid which may be present, the reaction product is treated with 118.7 parts by weight of 33.7% sodium hydroxide solution, whereby the tri-alkyl-barbituric acid is again dissolved. The tetra-alkyl-barbituric acid may then be removed by filtration or extraction. From the solution of its sodium salt N-methyl-C,C-allyl-isopropyl-barbituric acid is precipitated by the addition of acid. It may be purified by distillation in vacuo (boiling point 176–178° C./12 mm.), or by crystallization from dilute alcohol or petroleum ether and melts at 56–57° C.

The whole quantity of sodium hydroxide solution may also be added at the beginning without detrimental effect on the methylation with dimethyl-sulphate. After reaction with dimethyl-sulphate and filtration the reaction product is directly precipitated from the solution of its alkali salt with acid.

*Example 2*

184 parts by weight of N-methyl-C-isopropyl-barbituric acid are dissolved in 900 parts by weight of water and 133 parts by weight of 30% sodium hydroxide solution. Hereafter 121 parts by weight of allyl bromide are added and stirred at 30–35° C. until the allyl bromide has disappeared. The N-methyl-C,C-allyl-isopropyl-barbituric acid thus obtained is purified either by distillation in vacuo (boiling point 176–178° C./12 mm.) or by crystallization from dilute alcohol or petroleum ether.

The transformation may be carried out more quickly and at a lower temperature if small quantities of copper or of copper compounds are added as described in the process of German Patent No. 526,854.

*Example 3*

To a solution of 57 parts by weight of sodium in 630 parts by weight of absolute alcohol 110 parts by weight of methyl carbamide and 242 parts by weight of isopropyl-allyl-malonic-ester are added. The whole mixture is heated for 6–8 hours in an autoclave to 105° C. The alcohol is then removed by distillation. The residue is dissolved in ice water and acidified after filtration. The precipitated N-methyl-C,C-allyl-isopropyl-barbituric acid is purified either by distillation in vacuo or by crystallization from dilute alcohol or from petroleum ether.

I claim:

N-methyl-C,C-allyl-isopropyl-barbituric acid melting at 56–57° C., boiling at 176–178° C./12 mm., being easily soluble in the usual organic solvents and possessing valuable therapeutic properties.

OTTO SCHNIDER.